United States Patent
Liu

(10) Patent No.: US 9,286,365 B2
(45) Date of Patent: Mar. 15, 2016

(54) DATA SYNCHRONIZING SYSTEM AND METHOD THEREOF

(71) Applicants: INVENTEC (PUDONG) TECHNOLOGY CORPORATION, Shanghai (CN); INVENTEC CORPORATION, Taipei (TW)

(72) Inventor: Sean Liu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 429 days.

(21) Appl. No.: 13/803,552

(22) Filed: Mar. 14, 2013

(65) Prior Publication Data

US 2014/0081912 A1 Mar. 20, 2014

(30) Foreign Application Priority Data

Sep. 18, 2012 (CN) .......................... 2012 1 0348023

(51) Int. Cl.
*G06F 17/30* (2006.01)
*H04J 3/06* (2006.01)
*H04L 29/08* (2006.01)

(52) U.S. Cl.
CPC .......... *G06F 17/30575* (2013.01); *H04J 3/0641* (2013.01); *H04J 3/0658* (2013.01); *H04L 67/1095* (2013.01)

(58) Field of Classification Search
USPC ........................................................ 707/610
See application file for complete search history.

*Primary Examiner* — Amresh Singh
(74) *Attorney, Agent, or Firm* — Bacon & Thomas, PLLC

(57) ABSTRACT

A data synchronizing system and a method thereof are provided. One of clients capable of being connected to a synchronizing server may be selected as a synchronization processing client, and after the synchronization processing client is synchronized with all the clients, the synchronization processing client is synchronized with the synchronizing server, so as to achieve the technical efficacy of improving synchronizing convenience of a plurality of clients.

10 Claims, 5 Drawing Sheets

DATA SYNCHRONIZING SYSTEM AND METHOD THEREOF

BACKGROUND OF THE INVENTION

1. Field of the Invention

The present invention relates to a data synchronizing system and a method thereof, and more particularly to a data synchronizing system and a method thereof applied to a plurality of clients.

2. Description of Related Art

In recent years, with popularity of Internet and vigorous development of various mobile devices, data synchronized demands are also greatly increased accordingly.

Generally, in a conventional data synchronizing manner, two devices (referred to as client below) synchronize data with each other, such as, file or parameter. However, only two clients can be synchronized once, so when the number of clients is increased, all the clients can complete synchronization processing only under the premise of performing the operation for a plurality of times, and therefore the problem of synchronization inconvenience exists.

In view of this, manufacturers propose use of the cloud technology, where a synchronizing server is disposed and used for comprehensively planning synchronization processing of all the clients. For example, when clients are connected to the synchronizing server, the clients are synchronized automatically. In this way, synchronization processing efficiency of the client may be improved. Nevertheless, in the case of this manner, it must be ensured that all the clients can be connected to the synchronizing server; otherwise, synchronization processing of all the clients still cannot be completed. Actually, it is difficult to ensure that all the clients can be connected to the synchronizing server, so the foregoing manner still cannot effectively solve the problem of synchronization inconvenience of a plurality of clients.

To sum up, it can be known that in the prior art, the problem of synchronization inconvenience of a plurality of clients exists for a long time, so it is actually necessary to propose improved technical means to solve this problem.

SUMMARY OF THE INVENTION

In view of the problem existing in the prior art, the present invention discloses a data synchronizing system and a method thereof.

The data synchronizing system disclosed in the present invention includes: a synchronizing server and clients. The synchronizing server stores first synchronization data, and the clients store second synchronization data respectively. The client includes: a detecting module, a transmitting module, a selecting module and a synchronizing module. The detecting module is configured for detecting a state of a connection between the client and the synchronizing server, where when the state of the connection between the client and the synchronizing server is a connected state, the client is defined as a connected client; the transmitting module is configured for, when the client is a connected client, broadcasting a preset weight message, and receiving a weight message broadcasted by another connected client as a comparison message; the selecting module is used for selecting, from a weight sequence list, a connected client with the highest weight as a synchronization processing client; the synchronizing module is configured for, when the client is not defined as a synchronization processing client, synchronizing the client with the synchronization processing client according to the second synchronization data; when the client is defined as a synchronization processing client and after the client is confirmed to have been synchronized with another client, connecting the client to the synchronizing server, so as to synchronize the synchronization processing client with the synchronizing server according to the first synchronization data; and after the synchronization processing client and the synchronizing server have been synchronized, synchronizing the synchronization processing client with all the clients.

A The data synchronizing method of the present invention is applied to a network environment including a synchronizing server and clients, and includes: the synchronizing server storing first synchronization data, and each client storing second synchronization data respectively; the client detecting a state of a connection between the client and the synchronizing server, where when the state of the connection between the client and the synchronizing server is a connected state, the client is defined as a connected client; when the client is a connected client, broadcasting a preset weight message, and receiving a weight message broadcasted by another connected client as a comparison message; the client comparing the weight message with the comparison message, so as to generate a weight sequence list, and selecting a connected client with the highest weight as a synchronization processing client from the weight sequence list; and when the client is not defined as a synchronization processing client, synchronizing the client with the synchronization processing client according to the second synchronization data; when the client is defined as a synchronization processing client and after the client is confirmed to have been synchronized with another client, connecting the client to the synchronizing server, so as to synchronize the synchronization processing client with the synchronizing server according to the first synchronization data; and after the synchronization processing client and the synchronizing server have been synchronized, synchronizing the synchronization processing client with all the clients.

The system and the method disclosed in the present invention are described as above, and the difference between the present invention and the prior art lies in that in the present invention, one of clients capable of being connected to the synchronizing server may be selected as a synchronization processing client, and after the synchronization processing client is synchronized with all the clients, the synchronization processing client is synchronized with the synchronizing server.

Through the foregoing technical means, the present invention may achieve the technical efficacy of improving synchronizing convenience of a plurality of clients.

BRIEF DESCRIPTION OF THE DRAWINGS

The invention will become more fully understood from the detailed description given herein below illustration only, and thus is not limitative of the present invention, and wherein.

DETAILED DESCRIPTION OF THE EMBODIMENTS

The present invention will be apparent from the following detailed description, which proceeds with reference to the accompanying drawings, wherein the same references relate to the same elements.

Before the data synchronizing system and the method thereof disclosed in the present invention are illustrated, terms defined in the present invention are illustrated first. In the present invention, the synchronizing server refers to a serving host interconnected to Internet and used for providing a storage space used for synchronization processing; the client refers to a computer operated by a user, such as a computer host, a personal digital assistant, and a smart mobile phone. It should be particularly noted that, a client capable of being interconnected to a synchronizing server through Internet is regarded as a connected client, and a computer with the highest executive performance is selected from the connected client as a synchronization processing client, and is defined as an intermediate host through which another client is synchronized with the synchronizing server. Subsequently, the architecture of a synchronizing server and a client is illustrated in detail with reference to accompanying drawings.

Figure 1:
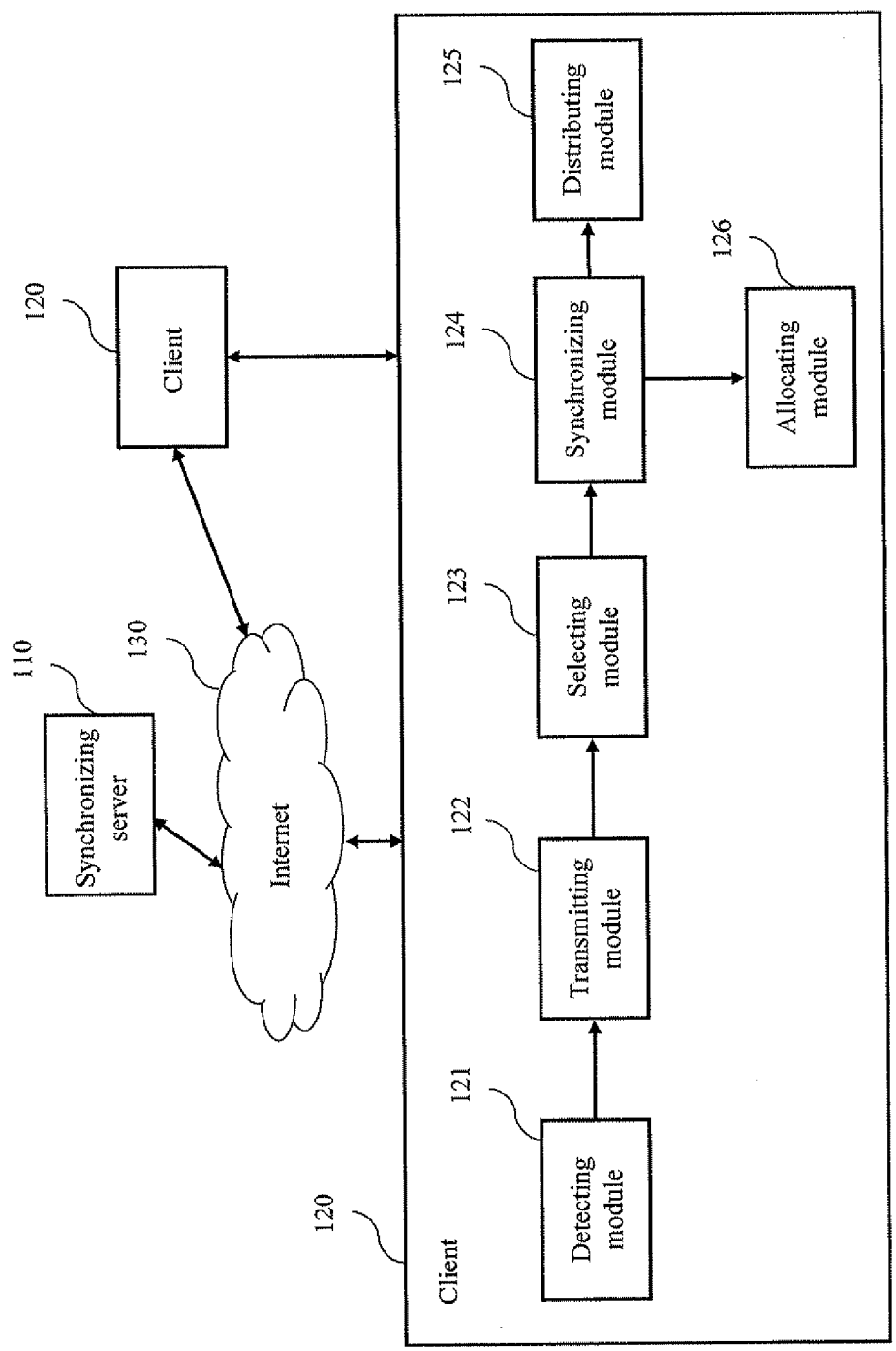
FIG. 1 is a system block diagram of a data synchronizing system of the present invention.

The data synchronizing system and the method thereof of the present invention are further illustrated below with reference to accompanying drawings. Referring to FIG. 1, FIG. 1 is a system block diagram of a data synchronizing system of the present invention. This system includes: a synchronizing server 110 and clients 120. The synchronizing server 110 stores first synchronization data, and the first synchronization data at least includes determination data used for synchronizing, such as modification time, modification number and modification data. For example, if a plurality of files stored in the synchronizing server 110 is modified, the synchronizing server 110 records final modification time, the number of modified files and names of modified files, so as to generate the first synchronization data and use this first synchronization data as basis of synchronization processing. In practical implementation, the synchronizing server 110 and Internet 130 are interconnected, at least one of clients 120 is required to be interconnected to Internet 130, and different clients 120 are also required to be interconnected, for example, through a local area network and a transmission line.

With respect to the clients 120, each client 120 stores second synchronization data respectively, and each client 120 includes: a detecting module 121, a transmitting module 122, a selecting module 123 and a synchronizing module 124. The detecting module 121 is configured for detecting a state of a connection between the client 120 and the synchronizing server 110, where when the state of the connection between the client 120 and the synchronizing server 110 is a connected state, the client 120 is defined as a connected client. It should be particularly noted that, like the first synchronization data, the second synchronization data at least includes determination data used for synchronizing, such as modification time, modification number and modification data.

The transmitting module 122 is configured for, when the client 120 is a connected client, broadcasting a preset weight message, for example, "A; 5" represents a weight message (where "A" represents a client identifier; "5" represents a weight value); and receiving a weight message broadcasted by another connected client as a comparison message. For example, if a plurality of clients 120 can all be interconnected to the synchronizing server 110 through Internet 130, the transmitting module 122 transfers its own weight message to another client 120 in a broadcast manner, and receives a weight message broadcasted by another client 120, for example, a value "B; 4" is defined as a comparison message. In this way, besides its own preset weight message, the client 120 also has a weight message of another client 120 (namely, comparison message).

The selecting module 123 is used for comparing the weight message with the comparison message, so as to generate a weight sequence list, and selecting a connected client with the highest weight as a synchronization processing client from the weight sequence list. As far as the above example is concerned, the weight message of the client 120 is a value "A; 5", and the comparison message records that the weight message of another client 120 is a value "B; 4", so after the comparison, client identifiers may be sequentially arranged according to the magnitude of values in a descending order, so as to generate the weight sequence list, such as, "A, B" (the weight value "5" is greater than the weight value "4", so the client identifier "A" is arranged in front of the client identifier "B", and the one arranged foremost also represents the highest weight), and then, a connected client with a client identifier being "A" is selected as a synchronization processing client. In practical implementation, a weight value may further use a connection parameter such as network rate or bandwidth, or is replaced with a processor parameter such as processor clock. For example, the connection parameter may be recorded as "20 Mbps", the processor parameter may be recorded as "1.7 GHz", and the sequence is arranged according to the magnitude of values likewise. It should be particularly noted that, the present invention is illustrated with the foregoing example, but the present invention is not limited to this, and none of manners capable of selecting a connected client as a synchronization processing client according to a weight message departs from the application scope of the present invention.

The synchronizing module 124 is configured for, when the client 120 is not defined as a synchronization processing client, synchronizing the client 120 with the synchronization processing client according to the second synchronization data; when the client 120 is defined as a synchronization processing client and after the client 120 is confirmed to have been synchronized with another client 120, connecting the client 120 to the synchronizing server 110, so as to synchronize the synchronization processing client with the synchronizing server 110 according to the first synchronization data; and after the synchronization processing client and the synchronizing server 110 have been synchronized, synchronizing the synchronization processing client with all the other clients 120. In other words, the client 120 being not a synchronization processing client is first synchronized with the synchronization processing client, then the synchronization processing client is synchronized with the synchronizing server 110, and then after the synchronization processing client and the synchronizing server 110 have been synchronized, the synchronization processing client is synchronized with all the other clients 120 again. Synchronizing according to synchronization data is the conventional technology, and therefore is not illustrated anymore herein.

Additionally, the client 120 may further include a distributing module 125, which is configured for, when the client 120 is a connected client, connecting the client 120 to the synchronizing server 110 through Internet 130 and selecting at least one piece of data to be modified (such as, file or parameter) from modification data according to the first synchronization data and the second synchronization data for synchronizing. In other words, this synchronizing manner is coordinated synchronizing (namely, a whole file required to be synchronized is divided into a plurality of partial files, which is allocated to each connected client only synchronizing one partial file, and after all the partial files have been synchronized, the synchronized partial files are integrated into a complete whole file, and later, all the clients are each synchronized with the whole file). In practical implementation, the client 120 may also include an allocating module 126, which is configured for, when the client 120 is defined as a synchronization processing client and before the client 120 is synchronized with the synchronizing server 110, first calculating the number of files required to be synchronized, and allocating the files required to be synchronized to the synchronization processing client and each connected client in combination with the number of connected clients and weight messages thereof, so that the synchronization processing client and each connected client can be synchronized for data required to be synchronized through Internet 130 and the synchronizing server 110 respectively. Then, after both the synchronization processing client and each connected client have downloaded respective data required to be synchronized, the allocating module 126 again synchronizes and integrates the respective data synchronized by the synchronization processing client and each connected client from the synchronizing server 110.

Figure 2A:
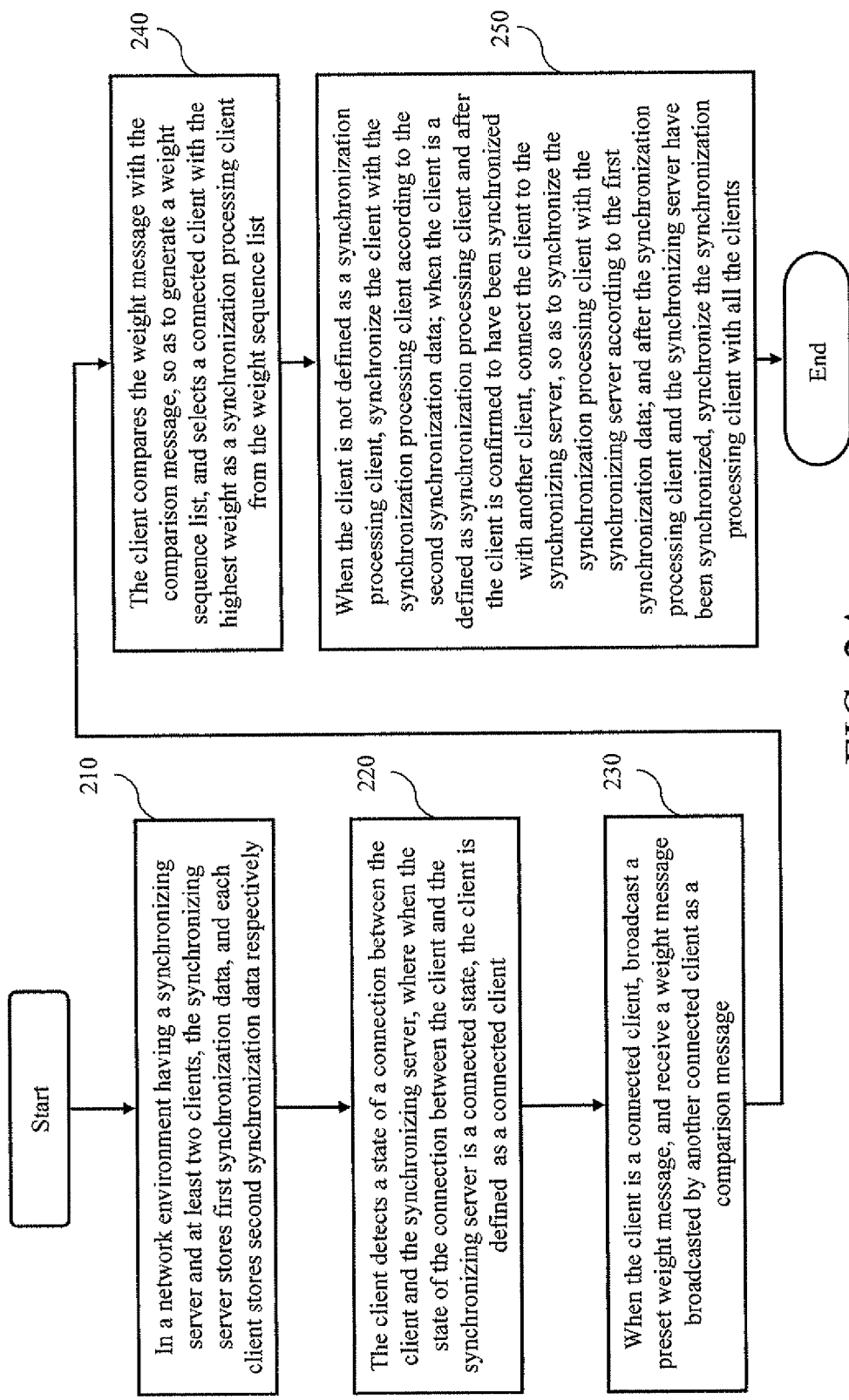
FIG. 2A and FIG. 2B are method flow charts of a data synchronizing method of the present invention.
Figure 2B:
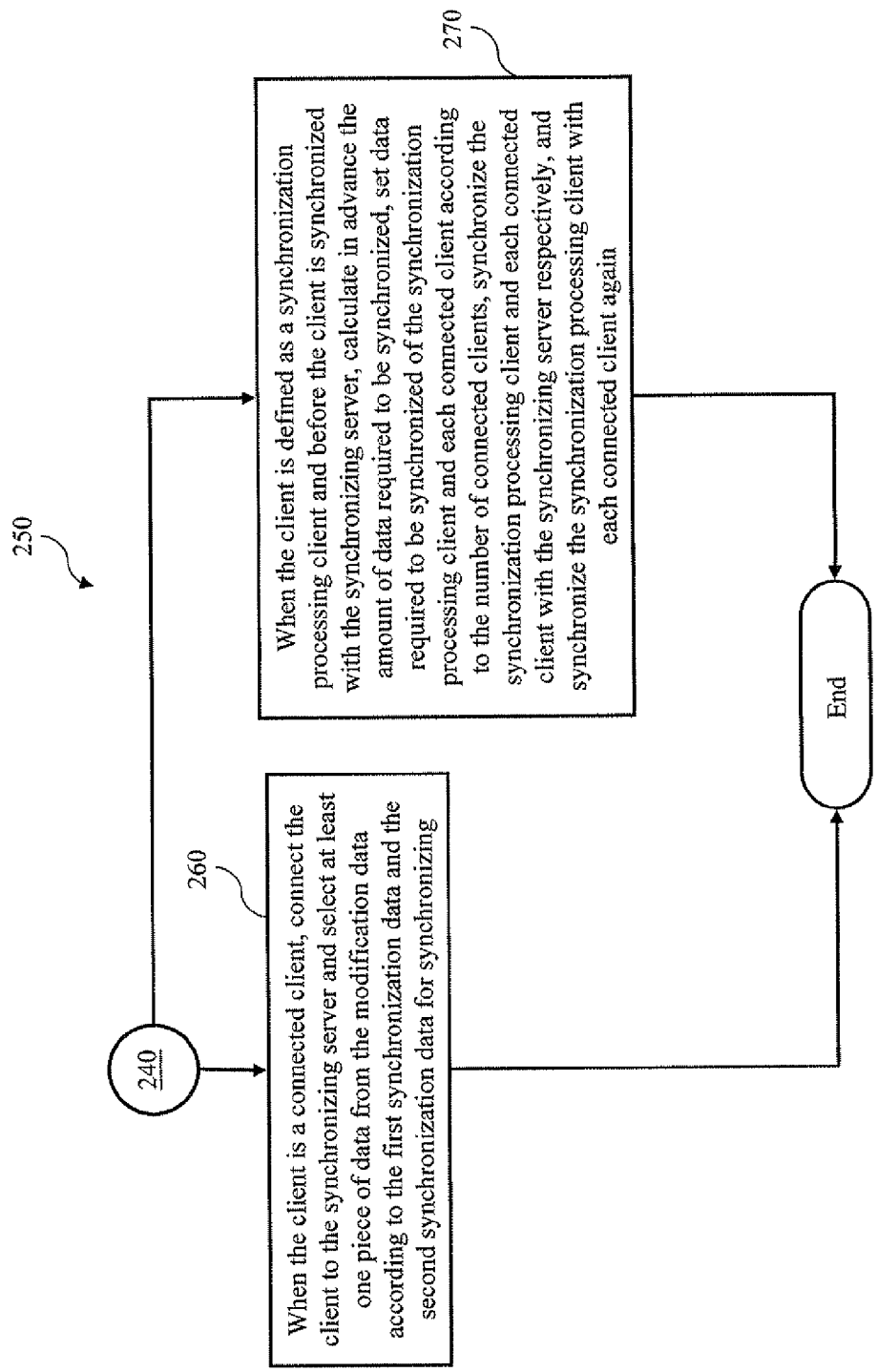

Then, referring to FIG. 2A and FIG. 2B, FIG. 2A and FIG. 2B are method flow charts of a data synchronizing method of the present invention, and the method includes the following steps. In a network environment including a synchronizing server 110 and clients 120, the synchronizing server 110 stores first synchronization data, and each client 120 stores second synchronization data respectively (step 210); the client 120 detects a state of a connection between the client 120 and the synchronizing server 110, where when the state of the connection between the client 120 and the synchronizing server 110 is a connected state, the client 120 is defined as a connected client (step 220); when the client 120 is a connected client, broadcast a preset weight message, and receive a weight message broadcasted by another connected client as a comparison message (step 230); the client 120 compares the weight message with the comparison message, so as to generate a weight sequence list, and selects a connected client with the highest weight as a synchronization processing client from the weight sequence list (step 240); and when the client 120 is not defined as a synchronization processing client, synchronize the client 120 with the synchronization processing client according to the second synchronization data; when the client 120 is defined as a synchronization processing client and after the client 120 is confirmed to have been synchronized with another client 120, connect the client 120 to the synchronizing server 110, so as to synchronize the synchronization processing client with the synchronizing server 110 according to the first synchronization data; and after the synchronization processing client and the synchronizing server 110 have been synchronized, synchronize the synchronization processing client with all the clients 120 (step 250). Through the foregoing steps, one of clients capable of being connected to the synchronizing server may be selected as the synchronization processing client, and after the synchronization processing client is synchronized with all the clients, the synchronization processing client is synchronized with the synchronizing server.

In practical implementation, in step 250, when the client 120 is a connected client, connect the client 120 to the synchronizing server 110 and select at least one piece of data from the modification data to synchronize the client 120 with the synchronizing server 110 according to the first synchronization data and the second synchronization data (step 260); or when the client 120 is defined as a synchronization processing client and before the client 120 is synchronized with the synchronizing server 110, and after calculating in advance the amount of data to be synchronized and setting data required to be synchronized by the synchronization processing client and each connected client according to the number of connected clients, synchronize the synchronization processing client with each connected client through Internet 130 and the synchronizing server 110 respectively, and synchronize the synchronization processing client with each connected client again (step 270). In practical implementation, the manner in step 260 of synchronizing the synchronization processing client with each connected client through Internet 130 and the synchronizing server 110 respectively is partial synchronizing (such as, only a part of the data is synchronized), and the manner in step 270 of synchronizing the synchronization processing client with each connected client again is complete synchronizing (such as, all the data is synchronized). The partial synchronizing manner and the complete synchronizing manner are the conventional technology, and therefore are not described anymore herein.

Figure 3:
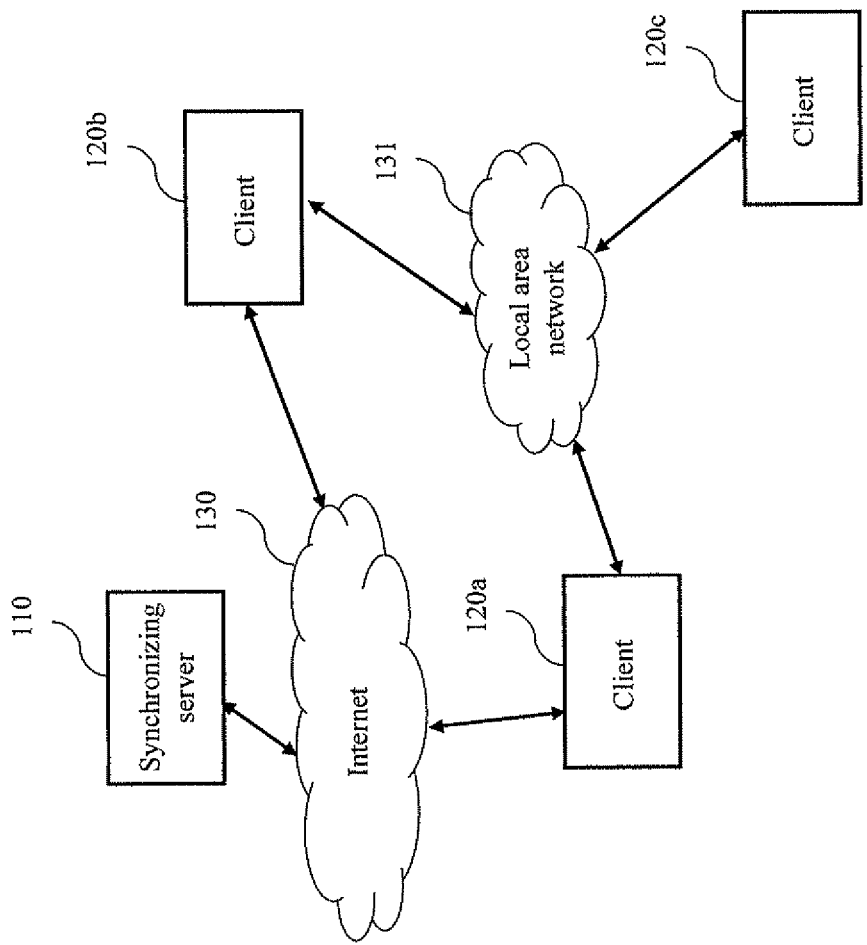
FIG. 3 is a schematic diagram of a first embodiment in which the present invention is applied to synchronize data.

Embodiments are illustrated below with reference to FIG. 3 and FIG. 4. Referring to FIG. 3, FIG. 3 is a schematic diagram of a first embodiment in which the present invention is applied to synchronize data. At first, clients (120a, 120b and 120c) detect a state of a connection between the clients and a synchronizing server 110. In this example, the clients (120a and 120b) can be connected to the synchronizing server 110 through Internet 130, while the client 120c cannot be connected to the synchronizing server 110, but can be connected to another clients (120a and 120b) through a local area network 131. Therefore, a detecting module 121 of the clients (120a and 120b) is regarded as a connected client. Then, the clients (120a and 120b) are connected clients, so the transmitting module 122 thereof broadcasts a preset weight message, and receives a weight message broadcasted by another connected client as a comparison message. In other words, the client 120a broadcasts a weight message preset by the client 120a to the client 120b and the weight message is provided to the client 120b as a comparison message, and vice versa. Later, the selecting module 123 of the clients (120a and 120b) compares the weight message with the comparison message, so as to generate a weight sequence list. If the weight message preset by the client 120a is "A; 10 Mbps", and the weight message preset by the client 120b is "B; 8 Mbps", where "A" and "B" represent client identifiers; "10 Mbps" and "8 Mbps" represent network parameters (bandwidth), the weight sequence list generated by the selecting module 123 may be sequentially arranged in a descending order on the basis of the bandwidth recorded with the network parameters, such as, recorded as "A, B" (the one arranged foremost represents the largest weight), and the selecting module 123 selects the client 120a corresponding to the client identifier "A" from the weight sequence list as a synchronization processing client.

Next, the clients (120b and 120c) are not synchronization processing clients, so the clients (120b and 120c) are synchronized with a synchronization processing client (namely, the client 120a) according to the second synchronization data stored in the synchronization processing client, and after the client 120a is confirmed to have been synchronized with another clients (120b and 120c), the client 120a is connected to the synchronizing server 110 through Internet 130, so that the synchronization processing client (namely, the client 120a) is synchronized with the synchronizing server 110 according to the first synchronization data.

Furthermore, after the synchronization processing client (namely, the client 120a) is confirmed to have been synchronized with another clients (120b and 120c), the synchronization processing client (namely, the client 120a) may calculate the amount of data required to be synchronized between the synchronization processing client and the synchronizing server 110 (for example, 180 MB of data required to be downloaded from the synchronizing server 110), and according to connected clients (namely, the client 120a and the client 120b; in this example, the client 120a is both a synchronization processing client and a connected client) and their respective weight messages (if a connection parameter is taken as a weight message, the weight messages of the client 120*a* and the client 120*b* may be "10 Mbps" and "8 Mbps") respectively, be used for allocating a task of downloading 100 MB of data to the connected client (namely, the client 120*a*), and allocating a task of downloading 80 MB of data to the connected client (namely, the client 120*b*). After respective downloading tasks of the client 120*a* and the client 120*b* are completed, the client 120*a* and the client 120*b* synchronize data, and 80 MB of data downloaded by the client 120*b* is transmitted to the client 120*a*, so that the client 120*a* has the whole required 180 MB of data. Later, other clients may be synchronized with the client 120*a* respectively, so as to acquire the whole 180 MB of data. So far, data synchronization between the clients (120*a*, 120*b* and 120*c*) and the synchronizing server 110 is completed.

Figure 4:
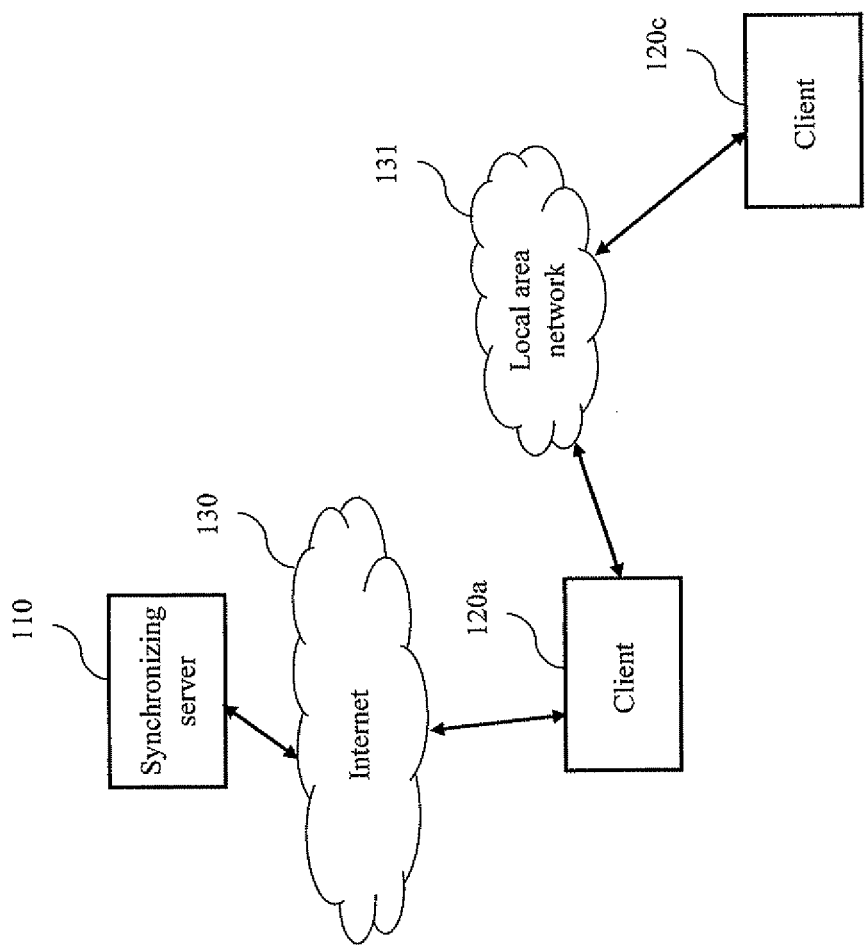
FIG. 4 is a schematic diagram of a second embodiment in which the present invention is applied to synchronize data.

Referring to FIG. 4, FIG. 4 is a schematic diagram of a second embodiment in which the present invention is applied to synchronize data. In practical implementation, as shown in FIG. 4, only one client 120 (namely, the client 120*a*) can be connected to the synchronizing server 110 through Internet 130, so after the detecting module 121 of the clients (120*a* and 120*e*) detects the state of the connection between the clients and the synchronizing server 110, the client 120*a* is defined as a connected client. In this case, the client 120*a* is a connected client, so the transmitting module 122 broadcasts a weight message. However, the client 120*c* is not a connected client, so the client 120*a* does not receive a weight message broadcasted by the client 120*c* as a comparison message. In this case, after the preset waiting time is up, the transmitting module 122 may use a null (Null) as a comparison message, and when the selecting module 123 detects a null in the comparison procedure, the generated weight sequence list only records the client identifier of the client 120*a*, and the connection parameter or processor parameter of the client 120*a*. The subsequent synchronizing flow is similar to that in the first embodiment, and therefore is not described anymore herein.

To sum up, it can be known that, the difference between the present invention and the prior art lies in that one of clients capable of being connected to a synchronizing server is selected as a synchronization processing client, and after the synchronization processing client is synchronized with all the clients, the synchronization processing client is synchronized with the synchronizing server, so this technical means may solve the problem existing in the prior art, so as to achieve the technical efficacy of improving synchronizing convenience of a plurality of clients.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data synchronizing system, comprising:
   a synchronizing server, configured for storing a first synchronization data; and
   at least two clients, wherein each client stores a second synchronization data respectively, and each client comprises:
   a detecting module, configured for detecting a state of a connection between a client and the synchronizing server, wherein when the state of the connection between the client and the synchronizing server is a connected state, the client is defined as a connected client;
   a transmitting module, configured for, when the client is a connected client, broadcasting a preset weight message, and receiving a weight message broadcasted by another connected client as a comparison message;
   a selecting module, configured for comparing the weight message with the comparison message, so as to generate a weight sequence list, and selecting a connected client with the highest weight as a synchronization processing client from the weight sequence list; and
   a synchronizing module, configured for, when the client is not defined as a synchronization processing client, synchronizing the client with the synchronization processing client according to the second synchronization data; when the client is defined as a synchronization processing client and after the client is confirmed to have been synchronized with another client, connecting the client to the synchronizing server, so as to synchronize the synchronization processing client with the synchronizing server according to the first synchronization data; and after the synchronization processing client and the synchronizing server have been synchronized, synchronizing the synchronization processing client with all the clients.

2. The data synchronizing system according to claim 1, wherein the first synchronization data and the second synchronization data both at least comprise modification time, modification number and modification data.

3. The data synchronizing system according to claim 2, wherein the client further comprises a distributing module, configured for, when the client is a connected client, connecting the client to the synchronizing server and selecting at least one piece of data from the modification data according to the first synchronization data and the second synchronization data for synchronizing.

4. The data synchronizing system according to claim 1, wherein the weight message comprises a client identifier and comprises a connection parameter or a processor parameter, wherein the connection parameter at least records a network rate or bandwidth, and the processor parameter at least records a processing clock.

5. The data synchronizing system according to claim 1, wherein the client further comprise an allocating module, configured for, when the client is defined as a synchronization processing client and before the client is synchronized with the synchronizing server, calculating in advance the amount of data required to be synchronized, setting data required to be synchronized of the synchronization processing client and each connected client according to the number of connected clients, synchronizing the synchronization processing client and each connected client with the synchronizing server respectively, and synchronizing the synchronization processing client with each connected client again.

6. A data synchronizing method, applied to a network environment including a synchronizing server and at least two clients, comprising:
   storing first synchronization data by the synchronizing server, and storing second synchronization data respectively by each client;
   detecting a state of a connection between the client and the synchronizing server by the client, wherein when the state of the connection between the client and the synchronizing server is a connected state, the client is defined as a connected client;

broadcasting a preset weight message when the client is a connected client, and receiving a weight message broadcasted by another connected client as a comparison message when the client is a connected client;

comparing the weight message with the comparison message by the client, so as to generate a weight sequence list, and selecting a connected client with the highest weight as a synchronization processing client from the weight sequence list; and synchronizing the client with the synchronization processing client according to the second synchronization data when the client is not defined as a synchronization processing client; connecting the client to the synchronizing server when the client is defined as a synchronization processing client and after the client is confirmed to have been synchronized with another client, so as to synchronize the synchronization processing client with the synchronizing server according to the first synchronization data; and after the synchronization processing client and the synchronizing server have been synchronized, synchronizing the synchronization processing client with all the clients.

7. The data synchronizing method according to claim 6, wherein the first synchronization data and the second synchronization data both at least comprise modification time, modification number and modification data.

8. The data synchronizing method according to claim 7, further comprising: when the client is a connected client, connecting the client to the synchronizing server and selecting at least one piece of data from the modification data according to the first synchronization data and the second synchronization data for synchronizing.

9. The data synchronizing method according to claim 6, wherein the weight message comprises a client identifier and comprises a connection parameter or a processor parameter, wherein the connection parameter at least records a network rate or bandwidth, and the processor parameter at least records a processing clock.

10. The data synchronizing method according to claim 6, further comprising: when the client is defined as a synchronization processing client and before the client is synchronized with the synchronizing server, calculating in advance the amount of data required to be synchronized, setting data required to be synchronized of the synchronization processing client and each connected client according to the number of connected clients, synchronizing the synchronization processing client and each connected client with the synchronizing server respectively, and synchronizing the synchronization processing client with each connected client again.

* * * * *